Jan. 3, 1967  V. CIMBALI  3,295,765

DISCHARGE SPOUT FOR COFFEE MAKING MACHINES

Filed Jan. 15, 1965

INVENTOR:
VITTORIO CIMBALI
By Silverman + Coos
ATT'YS.

United States Patent Office 3,295,765
Patented Jan. 3, 1967

3,295,765
DISCHARGE SPOUT FOR COFFEE MAKING MACHINES
Vittorio Cimbali, Milan, Italy, assignor to Officine Cimbali Giuseppe S.p.A., Binasco (Milan), Italy, Societa per Azioni, a corporation of Italy
Filed Jan. 15, 1965, Ser. No. 425,696
Claims priority, application Italy, Jan. 20, 1964, A 43,070
3 Claims. (Cl. 239—565)

Each conventional coffee making machine for preparing so called "cream of coffee" in which the coffee that seeps into the coffee-cups presents a thick surface of golden froth, is provided with one or more infusion heads, whose lower end is closed by the filter full of powdered coffee, the whole constituting the infusion chamber.

The filter is supported by a removable filter-holder provided with a double discharging spout to fill contemporaneously two coffee-cups.

This double discharging spout is usually integral with the filter holder.

It is known that in these machines one of greatest difficulties is that of obtaining in each of the two cups the same quantity of beverage; in other words a subdivision of the beverage which flows vertical descending from the filter, in two substantially equal portions.

It has been proposed to overcome this problem by providing an adjustable deflecting baffle plate but only partial success is achieved.

One of the objects of my invention is to provide a construction to be applied to the filter-holder, whereby it is obtained in each of the two cups substantially the same quantity of beverage.

Figure 1:
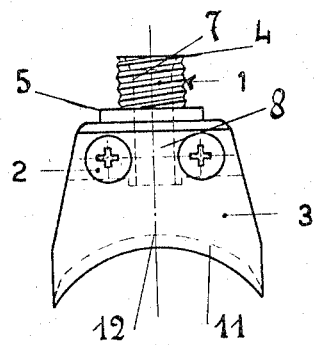
Figure 2:
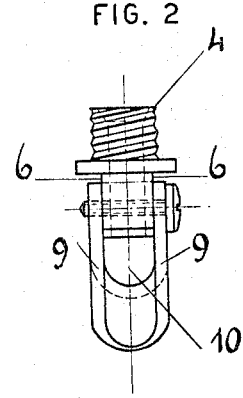
Figure 3:
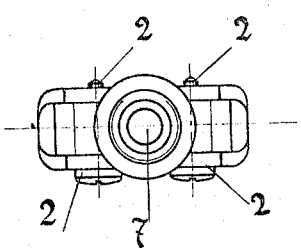

Other objects and advantages of my invention will appear from the following description of an embodiment shown schematically in the accompanying drawings in which the views are as follows:

FIG. 1 is a front elevation view of the discharge spout in which the invention is embodied, FIG. 2 is a side-view of the discharge spout shown in FIG. 1, FIG. 3 is a upper plan view of the same.

Referring now to the drawings reference numeral 1 indicates generally the first piece or member of a discharge spout having a shouldered flange 5 and a threaded cylindrical hollow projection 4 and thus adapted to be secured to a filter-holder (not illustrated in the drawings), provided in this case with a corresponding threaded central bore instead of the conventional double discharge spout, engaging flange 5 against the bottom surface of the said filter-holder.

The said first piece 1 has two parallel side surfaces 6.

A central passageway 7 is provided in the said first piece aligned with the passageway 8 of the hollow projection, through which the warm mixture of infusion water with vapor and air can flow downwards from the infusion chamber of the infusion head.

To the said first piece at its parallel side surfaces 6 are secured two planar extensions 9 comprising a second piece generally designated with reference numeral 3.

This second piece 3 has a bottom wall 10 of generally channelled configuration with a U-shaped cross-section. The base 13 of the U lies in an arcuate plane of curvature to the walls of U and generally normal relative thereto. The bottom wall 10 also can be generally described as being a saddle-like member of U-shaped cross-section.

The second device 3 is arranged with the channel member generally normal to the flow of liquid, the top or rise 12 in the channel floor being at the point of impact of flowing fluid since said rise 12 is aligned with central passageways 7 and 8.

In this manner, as rain, the mixture of infusion water with vapor and air, which from the infusion chamber (filter) flows downwards through the said vertical passageways 7 and 8, afterwards runs along a way in the open air.

That enables it, being not urged from different counter-pressures, to part in two equal quantities when the descending fluid impacts the summit of the channel, from which depart downwardly the two, in respect of the vertical, symmetric, branches of the channel. Thus the stream of descending fluid is divided, smoothly and without turbulence, to direct parts of said stream toward the opposite sides of the rise. Since the two branches of the channel are symmetrical in respect of the vertical, on both sides of the rise, substantially equal portions of the fluid flow through each branch, smoothly and without turbulence. In effect, the thus described bottom wall 10 may be characterized as a stream splitting member.

In order to establish such a vertical disposition even when the assembling of the machine in respect of the bank bar or the infusion head in respect of the machine is not unobjectionable, or when the passageway through the first piece is not more vertical, it is provided securing both the pieces 1 and 3 together by screws 2 or like, introduced in elongated bores provided in one of two pieces to be connected, the end of screws engaging the corresponding threaded bores provided in the other of the pieces to be connected.

After adjusting, the pieces will be secured to each other.

What I claim is:

1. In a coffee making machine with one or more infusion heads, whose lower end is closed by a filter full of powdered coffee, the whole constituting the infusion chamber, this filter being supported by a removable filter-holder applied to said head, a double discharge spout comprising a first member having a flange and a threaded cylindrical hollow projection and thus adapted to be secured to the filter-holder, which is provided with a corresponding threaded bore, engaging its said flange against the bottom surface of the said filter holder, the said first member having two parallel side surfaces and a vertical passageway formed therein aligned with that of the projection, a stream splitting member of generally channeled configuration with a U-shaped cross-section in which the base of the U lies in an arcuate plane of curvature to the walls of tht U and perpendicular thereto, the walls of the U each having a planar extension extending in a plane substantially normal to said plane of curvature of the base of the U, the upper ends of the extensions being secured to the side surfaces of the first member and the stream-splitting member arranged with the channel generally normal to the flow of liquid and having a rise in the channel floor at the point of impact of said liquid whereby to divide the stream smoothly and without turbulence to direct the parts of the stream toward the opposite sides of the rise.

2. A double discharge spout for a coffee making machine according to claim 1 wherein one of said members has elongated through openings formed therein and the other of said members has threaded openings aligned with said through openings, and screw means adapted to pass through said through openings to engage the corresponding threaded openings whereby the disposition of said stream splitting member is selectively positioned to place the rise at the impact point of the flowing fluid.

3. A double discharge spout for a coffee-making machine according to claim 1, wherein said extensions are integral with the walls of the U.

References Cited by the Examiner

UNITED STATES PATENTS

| 791,425 | 5/1905 | Johnson | 222—478 |
| 1,267,658 | 5/1918 | Green | 222—478 X |
| 2,715,484 | 8/1955 | Alexander | 222—478 |

M. HENSON WOOD, Jr., *Primary Examiner.*

CHARLES R. CARTER, *Examiner.*